Oct. 8, 1968 V. MANSFIELD 3,404,960
CONTINUOUS PROCESS FOR SIMULTANEOUSLY PRODUCING
COKE AND CARBON BLACK
Filed Dec. 11, 1967 2 Sheets-Sheet 1

INVENTOR
VAUGHN MANSFIELD

BY *James H. Little*

ATTORNEY

United States Patent Office 3,404,960
Patented Oct. 8, 1968

3,404,960
CONTINUOUS PROCESS FOR SIMULTANEOUSLY PRODUCING COKE AND CARBON BLACK
Vaughn Mansfield, Gallatin, Tenn., assignor to Peabody Coal Company, a corporation of Delaware
Continuation-in-part of application Ser. No. 330,081, Dec. 12, 1963. This application Dec. 11, 1967, Ser. No. 689,383
7 Claims. (Cl. 23—209.6)

ABSTRACT OF THE DISCLOSURE

A bed of coal from storage is fed horizontally through a carbonizer furnace on a chain grate and partially coked, and then dropped onto a downwardly moving stack in a shaft furnace wherein coking is completed, and thence passed through a coke cooler where it is quenched and then to coke storage. Cool inert gas is circulated through the cooler and lower portion of the shaft furnace and thence through a heat exchanger. Air is preheated in the heat exchanger and fed under pressure from airbox zones beneath the chain grate through the coal bed in controlled amounts sufficient only to achieve partial coking of the coal on the chain grate and to drive off hydrocarbons, but in sufficient amounts to achieve cracking temperature for unburned hydrocarbon driven from the coal thereby producing carbon black in the gaseous effluent from the coal. The gaseous effluent is taken off, quenched, and the carbon black is filtered from the exhaust. The exhaust is dampered so that the pressure in the carbonizer furnace above the bed is at least as high as atmospheric pressure, thereby avoiding inward air leaks so that the amount of air reaching the coal in the bed be closely controlled in such amounts as to minimize burning of the carbon black before recovery, and assuring process control.

Related Application

Figure 1:
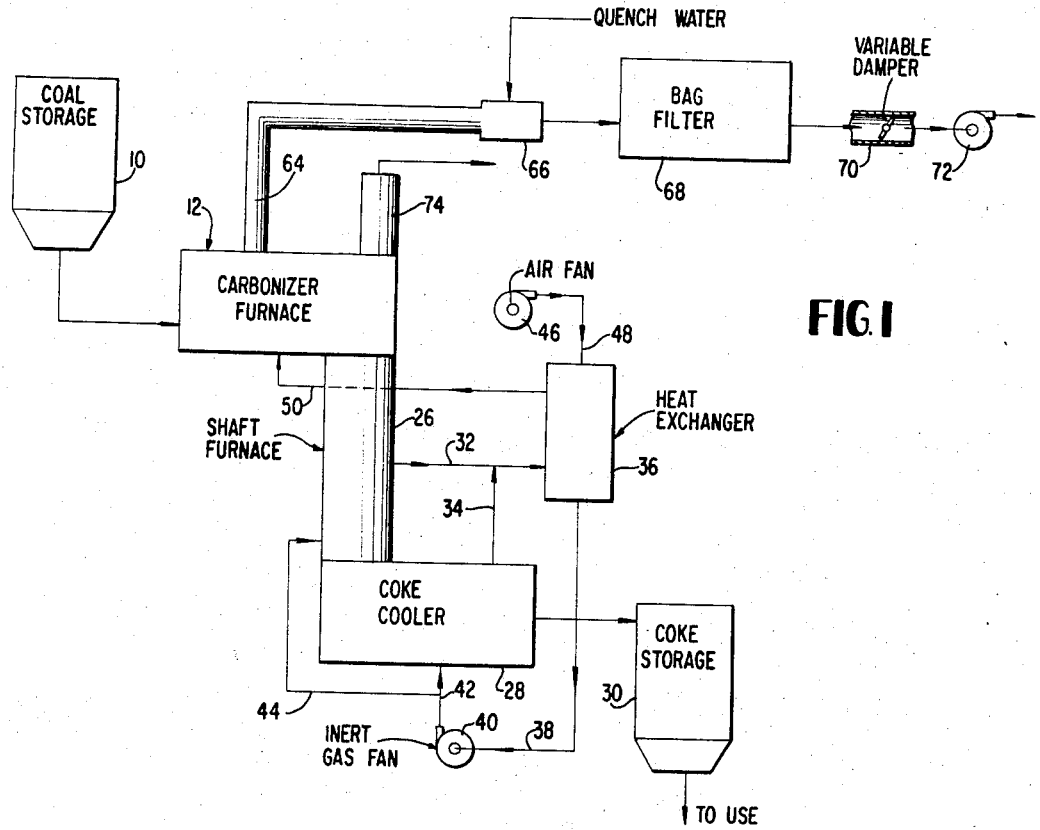

This application is a continuation-in-part of my application Ser. No. 330,081 filed Dec. 12, 1963, for simultaneous production of carbon black and coke, now abandoned.

Prior art

Mansfield 2,997,426 relates to a comparable coking process without the carbon black production and extraction. Mansfield 3,331,754 discloses the coke quenching process and apparatus used herein. Wood 2,886,567 discloses the production of carbon black from liquid hydrocarbon.

Objects

Insofar as is known, the production of carbon black in commercially usable quantities has entailed the use of gaseous or liquid hydrocarbons or readily fusible solid form as feed stock; and where attempt was made to make carbon black from coal, hydrocarbons were first distilled or converted to readily fusible solid and then utilized by conventional methods for producing the carbon black. The primary object now is to produce carbon black directly from coal while simultaneously producing coke.

In my prior application Ser. No. 330,081 there is disclosed the process for simultaneously producing carbon black and coke in the apparatus utilized herein, and while some of the results were promising, certain other unacceptable results occurred. The yield of carbon black per ton of coal was consistently low, and process control was lost to the extent that the vital characteristics of the carbon black could not be maintained throughout a run, or from one run to the next. It was known that the ratio of air fed to coal input was critical, but despite efforts to maintain close control of this ratio, carbon black yields remained low and process control was unattainable.

In the former operation of the present apparatus, which has become known in the coke industry as the "Chemcoke" process, and so far as is known about all previous coking processes utilizing a carbonizer like the one presently used, the furnace was always operated so as to maintain negative pressure in the furnace above the bed. Coking furnaces have been operated in this manner to prevent "puffing," or discharge of gases out of the furnace through the spreader gate and back through the in-feeding coal, and through inspection doors, also to prevent coal ignition from creeping back under the spreader gate into the coal in the hopper, and to prevent gases from escaping through other furnace structure. This, it has been discovered, is the reason why the ratio of air to coal could not be maintained within the limits required to prevent substantial burning of the carbon black, and why process control was lost. Although the air fed to the coal through the air boxes could be closely controlled, nevertheless the amount of air leaking into the furnace above the bed varied greatly. Air would enter the furnace through the coal feeding from the hopper onto the moving grate, and through leaks in the spreader gate or furnace itself, the result being that excessive air above the bed caused burning of the carbon black as it formed, and the operator could never tell precisely how much total air entered the furnace. The object now is to provide a process where the air feed can be closely controlled within critical limits.

In order to achieve the above objective, it would be desirable to maintain the pressure above the bed precisely at atmospheric pressure so that no air would be drawn in, and no gas would leak out. This, as a practical matter, thus far has not been feasible because of leakage and the solution has been found in the maintenance of from about 0.05 to 0.1 inch of water pressure above the bed. While this entails some slight leakage through the hopper and spreader gate, this is gas leakage out, and not air leakage in, and the out-leakage does not affect the ratio of air to coal.

Another object, which is related to the operation of the carbonizer furnace in such manner as to maintain at least atmospheric pressure above the bed, is to achieve air velocities through the bed in sufficient quantities to sweep up the maximum amount of carbon black from the coal in the bed without entraining excessive ash. From examination of the coke output, it appears that a certain amount of carbon black deposits on the coke as the latter forms, presumably while on the chain grate, and this deposited carbon black has thus far been unrecoverable. By maintaining the maximum permissible air velocities through the bed, within the permissible quantitative limits, and by also creating maximum permissible velocities in the gas stream above the bed, some of the carbon black formed in the bed can be entrained and the transit time of the carbon black above the bed can be reduced. This latter feature is believed to reduce the burning of the carbon black.

Figure 2:
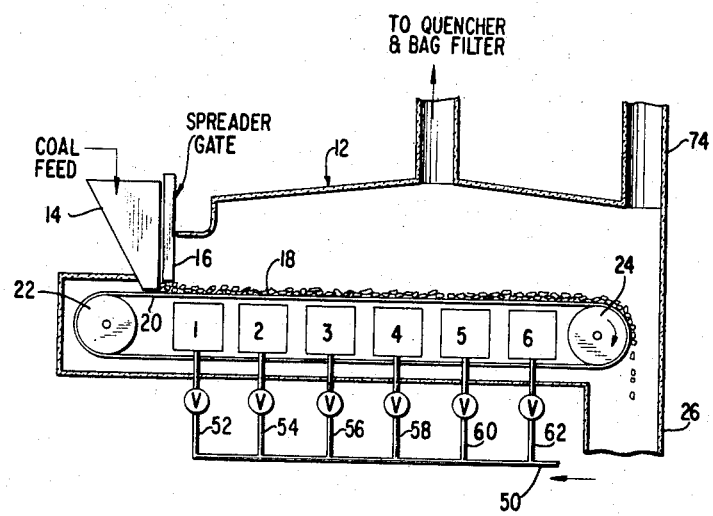
Figure 3:
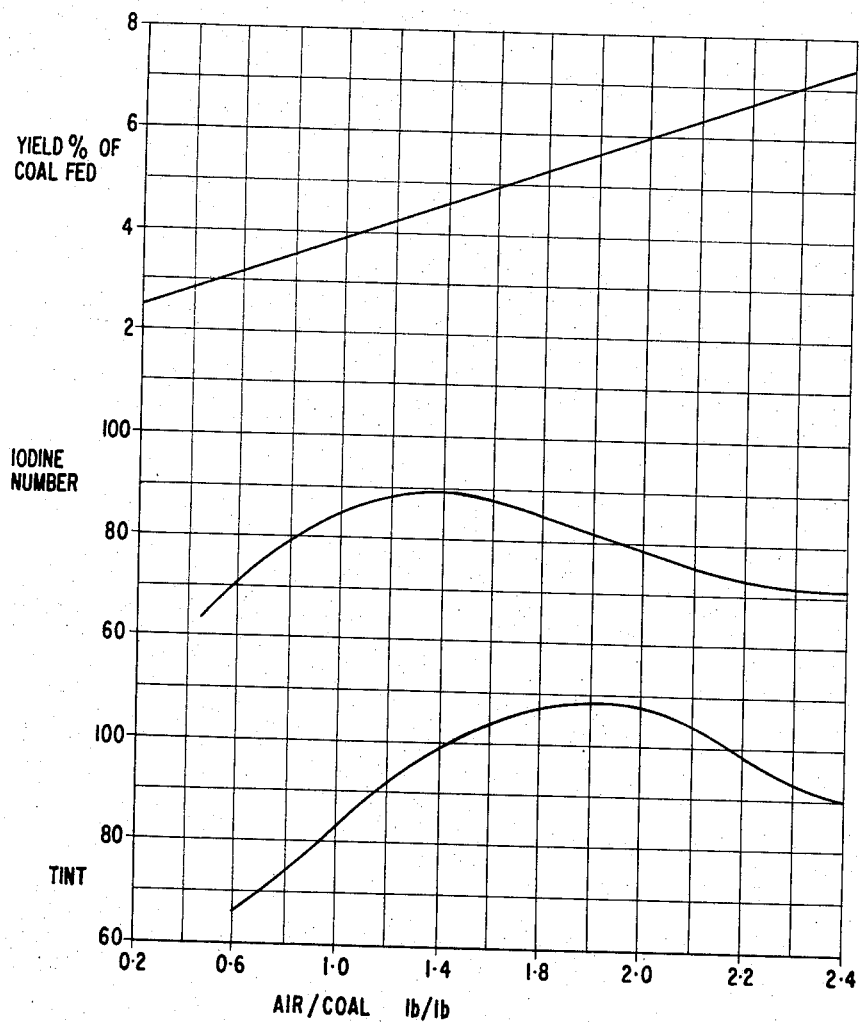

These and other objects will be apparent from the following specification and drawings, in which:

FIG. 1 is a diagram of the entire process;
FIG. 2 is a diagrammatic vertical cross section taken longitudinally through the carbonizer furnace; and
FIG. 3 is a graph showing yield of carbon black, iodine number and tint for increasing ratios of air per coal fed.

Before delineating the process in more detail, the over-all system utilized in the process will first be described. West Kentucky #11 coal sized 1¼" x 28 mesh, at ambient temperature, is fed into a carbonizer furnace 12 via a hopper 14 and distributed by a spreader gate 16 so as to form a bed 18 on a horizontally moving chain grate 20 running over sprockets 22, 24 driven by a suitable source of power so as to move the bed 18 horizontally through the carbonizer furnace, wherein partial coking of the coal occurs. The partially coked coal drops off the end of chain grate 20 onto the top of a downwardly moving stack in a shaft furnace 26 wherein coking of the coal is completed. From the bottom of shaft furnace 26 the coke moves through a cooler 28 to a coke storage bin 30 and thence to utilization.

Hot inert gas drawn from an intermediate portion of shaft furnace 26 via line 32 and from coke cooler 28 via line 34 is passed through a heat exchanger 36 where it is cooled, and thence via line 38, fan 40 and lines 42 and 44 to coke cooler 28 and the lower end of shaft furnace 26, the latter supplying make-up gas for the coke cooling system.

Primary combustion air is supplied from the atmosphere via a fan 46 and line 48 to heat exchanger 36, wherein it is heated to about 450° F., and thence via line 50 and branch lines 52–62 to windbox zones 1–6, the feed of the air to the individual zones being controlled by valves $v$. Ordinarily, air is supplied to zone 1 only during startup. The system thus far described has become known in the coke industry as the "CHEMCOKE" process utilized for producing coke, or coke and heat (where exhaust gases are fed to a boiler) and the operation of the subject process is generally the same except in that previously overfire air and/or leakage air entered the carbonizer furnace above the grate because the space above the grate was always at negative pressure, as contrasted with the subject process where (except for experimentation) the input air and exhaust gas balance is always maintained so that the atmosphere in the furnace above the bed is not at negative pressure.

In the subject process, hot combustion gases are fed via a stack 64 to a quencher 66, then through a big filter 68 where carbon black is recovered. The pressure in the furnace is controlled by a variable damper 70 through which the exhaust gas is pulled by a fan 72 and then discharged to the atmosphere. In some experimental operation of the system, some of the gases from the furnace were withdrawn via a second stack 74.

The furnace from which the present data was collected had a grate 3 ft. wide and 15 ft. long. On each side of and above the grate were a "water wall," i.e., pipes through which cooling water was circulated to prevent build up of ash on the walls. The details of the apparatus form no part of the invention since the process lends itself to other types of reactors, such as travelling grates, rotary hearths, reciprocating grates, etc.

In the operations described below, no carbon black falling precisely within the standards of present commercial grades was produced. However, many different types of black were produced and, by closely controlling the variables, particularly the air-coal ratio, the characteristics of the black produced are predictable, and they have characteristics indicative of commercial utility. The starting material was West Kentucky #11 coal sized 1¼ inches x 28 mesh. The black particle size ranged from 20 to 300 millimicrons. Percent of ash in all black produced was less than 0.7% and ph was between 3 and 5. Plus 325 mesh screen residue was below 0.2% at all times. Typical operations were as follows:

| Example | I | II | III | IV |
|---|---|---|---|---|
| Coal Feed, lb./hr | 1,510 | 1,704 | 1,224 | 1,220 |
| Grate Speed, ft./hr | 20 | 37 | 26 | 12.5 |
| Bed Depth, inches | 8 | 5 | 5 | 10 |
| Carbonized Pressure, in. W.C | 0.05 | 0.06 | 0.07 | 0.05 |
| Carbonizer Temperatures: | | | | |
| Feed, End, °F | 1,580 | 1,580 | 1,640 | 1,840 |
| Discharge end, °F | 1,540 | 1,500 | 1,660 | 1,600 |
| Metered Air, s.c.f.h.: | | | | |
| 1. Undergrate | | | | |
| Zone 1 | 0 | 0 | 0 | 0 |
| Zone 2 | 4,470 | 5,240 | 5,310 | 7,220 |
| Zone 3 | 4,300 | 5,240 | 5,370 | 6,990 |
| Zone 4 | 3,990 | 4,740 | 5,570 | 6,870 |
| Zone 5 | 3,560 | 4,940 | 4,900 | 6,750 |
| Zone 6 | 4,600 | 5,040 | 5,250 | 6,750 |
| 2. Overfire | 0 | 0 | 0 | 0 |
| Coke Made, lb./hr | 733 | 824 | 594 | 574 |
| Carbon Black Collected, lb./hr | 49.5 | 56.1 | 68.5 | 74 |
| Carbon Black Yield, Percent of Coal Fed | 3.27 | 3.3 | 5.6 | 6.07 |
| Air/Coal | 1.06 | 1.1 | 1.66 | 2.18 |
| Carbon Black Analysis: | | | | |
| Iodine Number | 84.7 | 89.1 | 85 | 75.4 |
| Tint | 67 | 78 | 104 | 75 |
| Oil Factor | 125 | 125 | 125 | 125 |
| Benzene Extract | 14.12 | 15.51 | 11.78 | 9.62 |
| Photolometer | 0.0 | 0.0 | 0.0 | 0.0 |

In all the above examples, the characteristics of the coke varied insignificantly. Typical coke analysis, dry basis, was as follows:

| | | |
|---|---|---|
| Fixed carbon | percent | 87.38 |
| Ash | do | 10.72 |
| Volatile | do | 1.9 |
| B.t.u. | | 12,621 |
| Sulfur | percent | 2.25 |

However, in runs wherein the pressure in the carbonizer furnace above the grate was negative, the carbon black yields were consistently low and the characteristics were unpredictable. Combustion air was drawn into the carbonizer furnace through the coal in the hopper, past the spreader gate and through other leaks in the furnace structure. Examples were as follows:

| Example | V | VI | VII |
|---|---|---|---|
| Coal Feed, lb./hr | 1,422 | 1,395 | 1,380 |
| Grate Speed, ft./hr | 32 | 32 | 32 |
| Bed Depth, inches | 5 | 5 | 5 |
| Carbonizer Pressure, in. W.C | −0.04 | −0.04 | −0.05 |
| Carbonizer Temperatures: | | | |
| Feed End, °F | 1,990 | 2,040 | 1,980 |
| Discharge End, °F | 1,800 | 1,940 | 1,720 |
| Metered Air, s.c.f.h.: | | | |
| 1. Undergrate | | | |
| Zone 1 | 0 | 0 | 0 |
| Zone 2 | 0 | 0 | 0 |
| Zone 3 | 0 | 0 | 0 |
| Zone 4 | 0 | 0 | 0 |
| Zone 5 | 0 | 0 | 0 |
| Zone 6 | 0 | 0 | 0 |
| 2. Overfire | 0 | 0 | 0 |
| Coke, lb./hr | 740 | 660 | 634 |
| Carbon Black Collected, lb./hr | 29.8 | 24.2 | 17 |
| Carbon Black Yield, Percent Coal Fed | 2.1 | 1.73 | 1.23 |
| Air/Coal | (1) | (1) | (1) |
| Carbon Black Analysis: | | | |
| Iodine Number | 39 | 26.2 | 17.2 |
| Tint | (2) | (2) | (2) |
| Oil Factor | 116 | 125 | 128 |
| Benzene Extract | (2) | (2) | (2) |
| Photolometer | 15.5 | 17.0 | 23.5 |

1 Unknown.   2 Not measured.

In Examples V, VI and VII, the tint and benzene extracts were not made because of the low carbon black yields which indicated that the process was not commercially valuable.

FIG. 3 is a graph showing the yield percent of carbon black for varying amounts of pounds per air per pound of coal, and correlated curves for iodine number and tint. The increase in carbon black yield with increasing ratios of air per pound of coal is contra to normal expectations. In the production of carbon black by normal processes, the percent of carbon black yield would be expected to decrease as the air/coal ratio is increased. This may be explained by the fact that, as the air/coal ratio is increased, the air velocity increases and more carbon black is swept off the coal in the bed and, probably, the transit time of the carbon black flowing above the bed is decreased, resulting in less burning of the carbon black. The iodine number and tint curves increase with initial increasing air/coal ratios, but they reach maximum points and thereafter decrease as the air/coal ratio increases further.

In other runs not detailed herein by specific examples in the above data, where the air/coal ratio was increased up to 2.4 lb. air/1 lb. coal, the percent yield of carbon black to coal fed increased on a virtually straight line to about 7.4% and the curves for iodine number and tint tended to flatten out. While the maximum permissible air/coal ratio has not yet been determined, satisfactory results have been obtained up to about 2.4 lb. air per 1 lb. coal, and the minimum practical ratio is about 1 lb. air per 1 lb. coal. On the basis of present data, it appears that the curve representing percent yield of carbon black to coal fed continues along a substantially straight line up to from about 2.8 lbs. to 3.0 lbs. of air per lb. coal fed, giving a yield of carbon black about 9% of coal fed, at about which point the air fed exceeds 50% of the stoichiometric amount needed for complete combustion of the volatile matter in the coal. At the range of about 2.8% lbs. to 3.0 lbs. of air per 1 lb. coal fed, it is predictable that the carbon black yield curve will reach its peak and thereafter ascend, which point is where the amount of burned carbon black starts to exceed the amount of entrained carbon black.

In the foregoing Examples I through IV, the pressure in the carbonizer furnace above the bed was controlled by the settings of the valves V and the setting of variable damper 70; and the furnace operated as a "black furnace," i.e., with limited visible combustion above the bed. In general, about 25% to 50% of the stoichiometric amount of air needed for complete combustion of the hydrocarbon portion of the coal may be admitted into the carbonizer furnace. As the coal is carried along by the chain grate, distillation occurs. Some carbon black is formed in the bed, and apparently the carbon black formation continues in the gas stream above the bed. The air stream through the bed must be strong enough to sweep off a substantial portion of the carbon black formed in the bed without entraining substantial quantities of ash, and the carbonizer furnace must not be operated at negative pressures above the bed if the carbon black yield is to be acceptable in quantity and predictable in quality, since these factors are directly dependent upon air/coal ratio, and this ratio cannot practically be determined or controlled when the furnace is operated at negative pressures.

I claim:
1. A method for simultaneously producing coke and carbon black which comprises:
   continuously feeding a substantially flat coal bed of predetermined thickness along a horizontal path of predetermined length through a hot carbonizer furnace;
   zone feeding from about 25% to 50% of the stoichiometric amount of air needed for complete combustion of the hydrocarbons in the coal upwardly through the bed, whereby to react with part of the hydrocarbons in the coal, raise the temperature of coal in the bed to coking temperature and partially coke the coal, and crack unreacted hydrocarbons to form carbon black while creating a hot gas stream through the bed in which formed carbon black is entrained and in which theretofore uncracked hydrocarbons are cracked both in and above the bed;
   dropping the partially coked coal off the end of the path into a downwardly moving stack in a shaft furnace and completing the coking of the coal in the shaft furnace;
   exhausting the gas stream from the carbonizer furnace;
   quenching the exhausted gas stream;
   extracting the entrained carbon black from the quenched gas stream;
   and dampering the exhausted gas stream relative to the underfire air so as to maintain a pressure of no less than 0.0 inch of water in the atmosphere of the carbonizer furnace above the bed and prevent leakage of atmospheric air into the furnace above the bed.

2. The method recited in claim 1, wherein the amount of underfire air fed unwardly through the bed is from about 1 lb. to about 2.2 lb. air per 1 lb. coal fed through the carbonizer furnace.

3. The method recited in claim 1, wherein the pressure of the atmosphere of the carbonizer furnace above the bed is maintained positively greater than 0.0 inch of water.

4. The method recited in claim 3, wherein the pressure of the atmosphere of the carbonizer furnace above the bed is maintained at from about 0.05 to about 0.07 inch of water.

5. The method recited in claim 1, wherein the amount of underfire air fed upwardly through the bed is from about 1 lb. to about 2.2 lb. air per 1 lb. coal fed through the carbonizer furnace and the pressure of the atmosphere in the carbonizer furnace above the bed is maintained positively greater than 0.0 inch of water.

6. The method recited in claim 5, wherein said pressure of the atmosphere is maintained at from about 0.05 to 0.07 inch of water.

7. A method for simultaneously producing coke and carbon black which comprises;
   continuously feeding a coal stream onto a moving perforate grate in a hot carbonizer furnace from the exterior thereof by means of an infeed device;
   spreading said coal stream by means of a spreader mechanism onto said grate to form a coal bed of predetermined thickness;
   wherein said in-feed device and said spreader mechanism are characterized by a tendency to permit gas to leak therepast between the atmosphere exterior of the furnace and the atmosphere within the furnace;
   transporting said coal bed substantially horizontally through said carbonizer furnace;
   zone feeding from about 25% to 50% of the stoichiometric amount of air needed for complete combustion of the hydrocarbons in the coal upwardly through the grate so as to react with part of the hydrocarbons in the coal, raise the temperature of the coal in the bed to coking temperature and partially coke the coal, and crack unreacted hydrocarbons to form carbon black while creating a hot gas stream through the bed in which theretofore uncracked hydrocarbons are cracked both in and above the bed;
   dropping the partially coked coal off the grate onto a downwardly moving coke stack in a shaft furnace and completing the coking of the coal in the shaft furnace;
   exhausting the gas stream from the carbonizer furnace;
   quenching the exhausted gas stream;
   extracting the entrained carbon black from the quenched gas stream;
   and controlling the atmospheric pressure within the carbonizer furnace so as to maintain no less than 0.0 inch of water above the bed so as to prevent leakage of atmospheric air from the exterior of the furnace into the interior thereof through said in-feed device and spreader mechanism by dampering the exhausted gas stream.

References Cited
UNITED STATES PATENTS

| | | | |
|---|---|---|---|
| 2,380,930 | 8/1945 | Anderson et al. | 201—32 X |
| 2,997,426 | 8/1961 | Mansfield | 201—27 |
| 3,013,951 | 12/1961 | Mansfield | 201—27 |
| 3,297,550 | 1/1967 | Alberts | 201—27 |

EDWARD J. MEROS, *Primary Examiner.*